United States Patent Office 3,221,413
Patented Dec. 7, 1965

3,221,413
DEVICE FOR CHECKING THE CONTOUR, ESPECIALLY TROCHOIDAL CONTOUR SURFACES, OF WORK PIECES
Erich Fesser, Cologne-Riehl, Germany, assignor to Klöckner-Humboldt-Deutz Aktiengesellschaft, Cologne, Germany
Filed July 18, 1963, Ser. No. 296,126
Claims priority, application Germany, July 20, 1962, K 47,283
7 Claims. (Cl. 33—174)

The present invention concerns a device for checking the contour of a work piece, especially the inner trochoidal contour surface of a housing for a rotary piston engine. Heretofore known checking devices for this purpose have means shaped in conformity with the kinematic production of the trochoid. These heretofore known devices, however, have an extremely complicated structure and, therefore, lack precision.

It is also known to check the contour surfaces of work pieces by comparing the same with positive or negative templates which are designed so as to be identical to the specified or true shape of the respective work piece to be produced and have their contour surface shaped so as to be parallel to the true shape to be produced while the overall size of the respective template is only slightly less than the area confined by the contour surface to be checked. Devices of this type, when used for checking work pieces of large dimensions, have the drawback that the templates cannot be produced with the necessary precision on ordinary machines. Moreover, the movement of the measuring feeler or the measuring head requires expensive devices.

It is, therefore, an object of the present invention to provide a checking device for checking the contour surface of a work piece, especially the inner trochoidal contour surface of a housing for a rotary piston engine, which will overcome the above mentioned drawbacks.

It is another object of this invention to provide a checking device as set forth in the preceding paragraph, which will make it possible to measure the distance of the contour surface of the template from the contour surface to be checked of the work piece.

These and other objects and advantages of the invention will appear more clearly from the following specification in connection with the accompanying drawings, in which:

FIG. 1 diagrammatically illustrates a checking device for checking the trochoidal inner surface of a housing of rotary piston engines.

Figure 1:
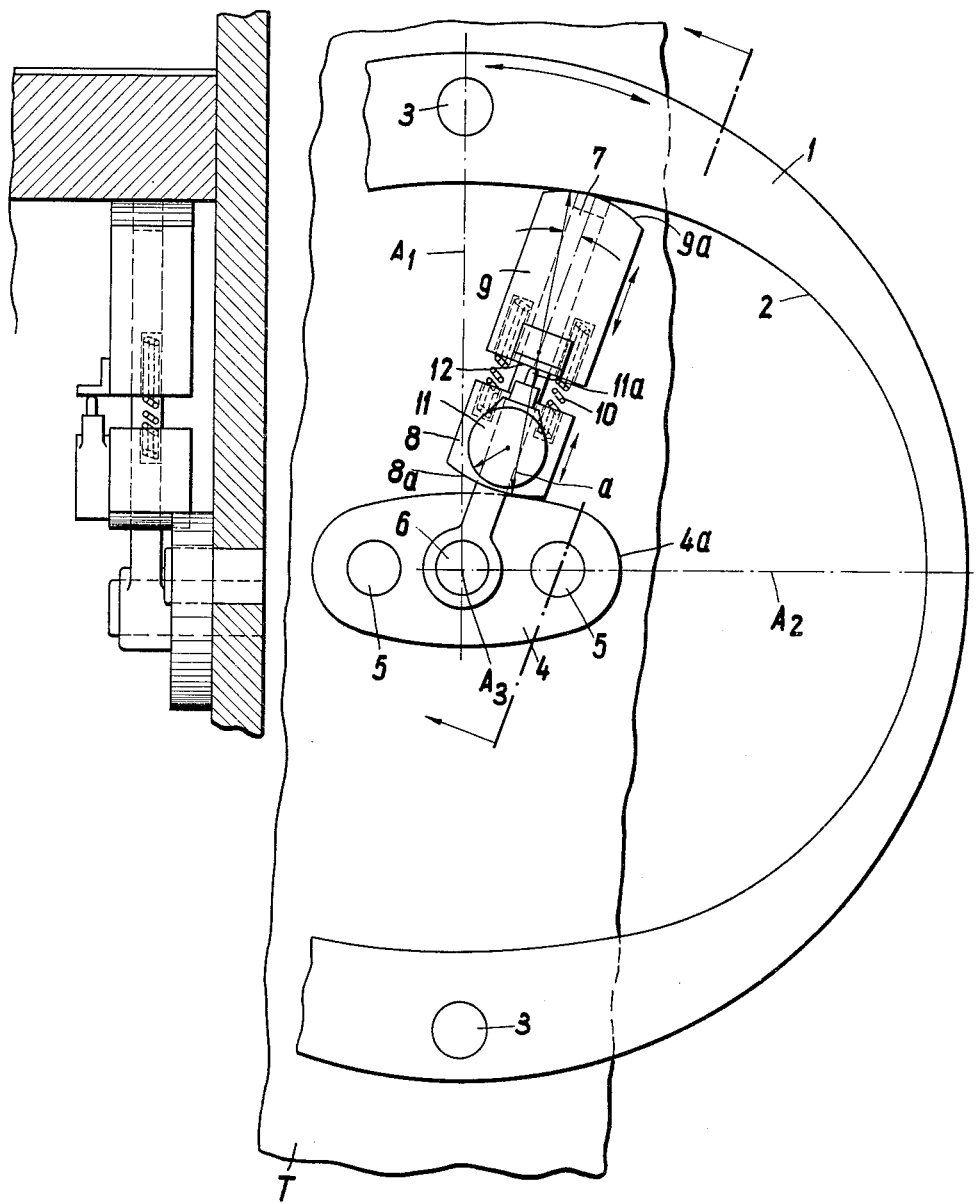
FIG. 1a is a vertical sectional view indicated by line Ia—Ia on FIGURE 1.

The present invention is characterized primarily by a template having its outer contour surface shaped in conformity with the contour of the work piece contour to be checked while means are provided for locating said template and the work piece to be checked coaxially with regard to each other so that the template will be located within and in spaced relationship to the contour of the work piece to be checked. The checking device furthermore comprises at least one arm radial to and pivotal about the common axis of the template and the work piece to be checked and carrying two feeler members for displacement thereon radially of said common axis and each of which has a curved contacting surface for contacting engagement with the contour surface of the template and the corresponding region of the contour surface of the work piece to be checked respectively. The feeler members are by yieldable means, as for instance springs, biased in a direction away from each other, while indicating means are provided for indicating the relative movement of the feeler members relative to each other. In this way, the template even when employed for checking large work pieces can be produced with such small dimensions as can be made with the necessary precision on standard machines.

The device according to the invention measures the distance between the template and the contour surface of the work piece to be checked. Coming fairly close to the theory, a feeler member in the form of a piston ring may be employed as measuring element by having the gap between the ends of the piston ring indicate the variation in the diameter.

According to one specific embodiment of the invention, the template surface may be equidistant from the specified or true shape of the contour surface to be produced on a work piece. More specifically, two measuring elements are displaceably mounted on a pivotable arm so as to be movable in the direction of the length of said arm, while the surfaces respectively contacting the template contour surface and the contour surface of the work piece to be checked follow the contour of a circle, the centers of the circles for each of said elements being located on the axis of the pivotable arm.

Due to the fact that the work piece contour to be checked as a rule deviates from the contour of a circle, with such a measurement the measured distance is disposed at an angle to the radial direction of the pivotable arm. Measured errors are influenced by this angle because the error indicator is sensitive to movement of the feeler members radially only by the common axis and, therefore, the indication of detected errors is influenced by the said angle. With angular deviations not exceeding 20°, as they are encountered for instance in connection with the measurement of the above mentioned trochoidal contour surface of housings for rotary piston engines, the influence on the indication of the errors is so minute that it may be neglected.

Whereas with the above described arrangements it was assumed that the template and work piece contacting surfaces of the feeler members followed the contour of one and the same circle, it should be noted that according to the invention the said contacting surfaces of the feeler members may also follow the contour of different circles so that the radius pertaining to one contacting surface may be smaller than the radius of the other contacting surface. Thus, for instance, in order to ascertain work piece errors of short dimensions, the circular shape of the feeler member for contact with the work piece to be checked may be of a considerably smaller radius than the contacting surface contacting the template. In such an instance, the shape of the template has to deviate from one whose surface is equidistant from the workpiece.

With identical or different radii of the circular contacting surface of the two measuring members it is also possible to select the respective radii and their centers so that the centers will not coincide but will be located at a smaller or larger distance from each other on the axis of the pivotable arm. The measuring members may, for instance, be designed as complete circular discs, while as measuring magnitude or factor the inner distance between the circular discs may be employed. In all such instances, the template likewise has to deviate from one whose surface is equidistant from the work piece. In every case the feelers engage the respective surfaces of the work piece or template in corresponding regions of the surfaces.

Referring now to the drawings in detail, the arrangement shown in FIG. 1 illustrating a checking device for checking the inner trochoidal surface 2 of a work piece 1 comprises a checking table T with setting pins 5 for receiving a template 4 and with setting pins 3 for receiving the work piece 1. The said setting pins 3 and 5 are so arranged that they will locate the work piece 1 coaxially with regard to the template 4 as is clearly shown in FIG. 1. In the particular arrangement according to FIG. 1 the outer contour surface 4a of the template 4 is designed to be equidistant from the trochoidal inner contour surface 2 of the work piece 1. This means that, assuming that the inner trochoidal surface 2 fully corresponds to the specified or true shape of the surface to be produced, the distances between the template contour surface 4a and the inner contour surface 2 of the work piece along the axes $A_1$ and $A_2$ are identical and the contour surfaces therebetween and respectively pertaining to the template 4 and work piece 1 are parallel to each other.

Supported for pivotal movement about the axis $A_3$ or extension thereof of template 4 is one or more arms 7 which extend radial to and are pivotable by 360° about axis $A_3$. Longitudinally displaceably mounted on each arm 7 are two measuring or feeler members 8, 9 which by means of springs 10 are yieldably pressed against corresponding regions of the contour surfaces 4a and 2 respectively of the template 4 and work piece 1 and held thereagainst. The respective contacting surfaces 8a, 9a of the feeler members 8, 9 are arcs of equal size circles while the two circles have a common center on the axis of the respective arm 7 when the contacting points of the contacting surfaces 8a, 9a with the contour surfaces 4a, 2 are spaced from each other by a distance between the contour surface 4a and such a point of contour surface 2 which is true to shape or in conformity with the specified shape. One of the feeler members, for instance feeler member 8, carries an indicator 11 with a measuring pin 11a in continuous engagement with the surface 12 of the feeler member 9.

It will thus be evident that when pivotable arm 7 turns about its shaft 6, or in other words about the axis $A_3$, indicator 11 will indicate any error in the trochoid with regard to the template contour surface 4a and thereby with regard to the specified shape for the trochoidal surface 2. When pivotable arm 7 is in alignment with the axis $A_1$ or the axis $A_2$, the measured distance between the template surface 4a and the trochoid surface 2 coincides with the radial direction of the arm 7. In intermediate positions, however, the measured distance $a$ has a variable angle inclination $\alpha$ with regard to the axis of the pivotable arm 7. The maximum angle inclination in the present case amounts to approximately 20°. Thus, with a template being precisely equidistant from the workpiece, indicator 11 in the event of an error in the work piece, would give an indication deviating from the actual work piece error by about 6% only.

Figure 2:
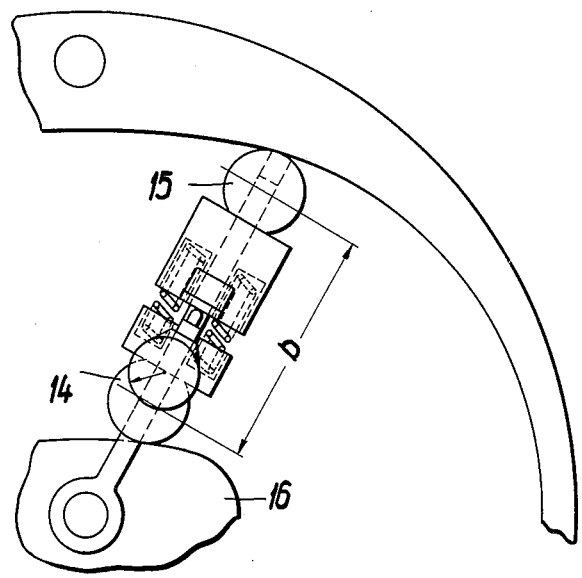
FIG. 2 shows a modified arrangement of the invention which differs from that of FIG. 1 primarily in that the contacting surfaces of the measuring feeler in FIG. 1 have according to FIG. 2 been replaced by roller or disc surfaces.

Referring now to the embodiment of FIG. 2, the feeler members 14, 15 which are similar to the arrangement of FIG. 1 are displaceable on a radial pivotable arm in a direction radial to the common axis of the template and work piece, and are designed as complete circular discs with relatively short radii. As a measuring factor, the distance $b$ between the axes of said discs 14, 15 is employed. If desired, the distance between the circumferences of the discs 14, 15 may be employed as a measuring factor. The said distance $b$ will in each position of the pivotable arm be the same if the work piece is true to shape. Accordingly, the template 16 has a shape deviating from one whose surface is equidistant from the workpiece, which shape can be ascertained by pure calculation and can be drawn up by dots ascertained in standard manner.

Figure 3:
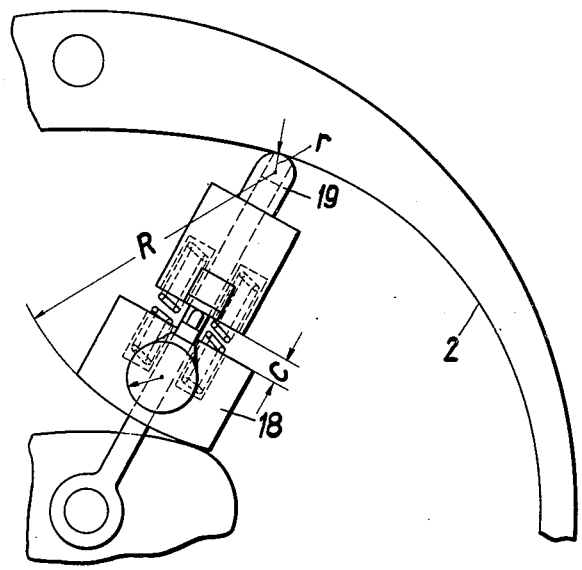
FIG. 3 is a diagrammatic illustration similar to that of FIG. 2 but differing therefrom in that the radii of the inner and outer feeler elements differ from each other.

According to the embodiment of FIG. 3, the contacting surfaces of the feeler members 18 and 19 have considerably different radii. The radius $r$ of the feeler member 19 contacting the work piece contour surface 2 is relatively short so as to be able also to feel an error extending over a short distance only. The magnitude of radius $r$ preferably corresponds to the radius of the sealing strips customarily used at the zenith or crest portions of the inner rotor of a rotary piston engine. The radius R of the feeler member 18 contacting the contour surface of the template 16 is so large that the centers of the two radii coincide on the axis of the tiltable arm. However, while this is a highly advantageous relationship, it is to be noted that this particular relationship is not necessary under all circumstances. In order that the measuring factor $c$ will be identical in each angular position of the pivotable arm 19, the template is designed so that it correspondingly deviates from one whose surface is equidistant from the inner contour of the work piece.

It is, of course, to be understood that the present invention is, by no means, limited to the particular arrangements shown in the drawings but also comprises any modifications within the scope of the appended claims.

What I claim is:

1. A checking device for checking the contour surface of a work piece, especially the inner trochoidal contour of a housing for a rotary piston engine, which includes: a template having an outside contour shaped in conformity with the contour surface of the work piece to be checked, means for locating said template and a work piece to be checked coaxially with regard to each other so that the template will be located within and in spaced relationship to the contour of the work piece to be checked, at least one arm pivotable about the common axis of said template and the work piece to be checked and extending radially from said common axis, two feeler members supported by and displaceable on said arm radially of said common axis, each of said two feeler members having a curved contacting surface for contacting engagement with the contour surface of said template and the corresponding contour surface of the work piece to be checked, yieldable means arranged between said feeler members and biasing the same so as to urge said feeler members to move relative to each other in the direction toward said template and the work piece to be checked respectively, and indicating means responsive to a movement of said feeler members relative to each other for indicating such relative movement.

2. A checking device for checking the contour surface of a work piece, especially the inner trochoidal contour of a housing for a rotary piston engine, which includes: a template having an outside contour shaped in conformity with the contour surface of the work piece to be checked, means for locating said template and a work piece to be checked coaxially with regard to each other so that the template will be located within and in spaced relationship to the contour of the work piece to be checked, at least one arm pivotable about the common axis of said template and the work piece to be checked and extending radially from said common axis, two feeler members supported by and displaceable on said arm radially of said common axis, each of said two feeler members having a circular contacting surface for contacting engagement with the contour surface of said template and the corresponding contour surface of the work piece to be checked, the centers of said circular surfaces being located on the longitudinal axis of the arm carrying said two feeler members, yieldable means arranged between said feeler members and biasing the same so as to urge said feeler members to move relative to each other in the direction toward said template and the work piece to be checked respectively, and indicating means responsive to a movement of said feeler members relative to each other for indicating such relative movement.

3. A checking device for checking the contour surface of a work piece, especially the inner trochoidal contour of a housing for a rotary piston engine, which includes: a template having an outside contour shaped in conformity with the contour surface of the work piece to be checked, means for locating said template and a work piece to be checked coaxially with regard to each other so that the template will be located within and in spaced relationship to the contour of the work piece to be checked, at least one arm pivotable about the common axis of said template and the work piece to be checked and extending radially from said common axis, two feeler members supported by and displaceable on said arm radially of said common axis, each of said two feeler members having a contacting surface of the same radius for contacting engagement with the contour surface of said template and the corresponding contour surface of the work piece to be checked respectively, both radii having their center point located on the longitudinal axis of said arm, yieldable means arranged between said feeler members and biasing the same so as to urge said feeler members to move relative to each other in the direction toward said template and the work piece to be checked respectively, and indicating means responsive to a movement of said feeler members relative to each other for indicating such relative movement.

4. A checking device for checking the contour surface of a work piece, especially the inner trochoidal contour of a housing for a rotary piston engine, which includes: a template having an outside contour shaped in conformity with the contour surface of the work piece to be checked, means for locating said template and a work piece to be checked coaxially with regard to each other so that the template will be located within and in spaced relationship to the contour of the work piece to be checked, at least one arm pivotable about the common axis of said template and the work piece to be checked and extending radially from said common axis, two feeler members supported by and displaceable on said arm radially of said common axis, each of said two feeler members having a curved contacting surface for contacting engagement with the contour surface of said template and the corresponding contour surface of the work piece to be checked, the arrangement being such that the radius of curvature of the feeler member adjacent said template being considerably greater than the radius of curvature of the feeler member on the same arm as said first feeler member but remote somewhat from said template, yieldable means arranged between said feeler members and biasing the same so as to urge said feeler members to move relative to each other in the direction toward said template and the work piece to be checked respectively, and indicating means responsive to a movement of said feeler members relative to each other for indicating such relative movement.

5. An arrangement according to claim 3, in which both radii have the same center point when the distance between the contacting point of one feeler member with said template and the contacting point of the other feeler member on the same arm with the work piece to be checked corresponds to the nominal spacing between said template and the work piece to be checked along a plane of symmetry of said template and the work piece to be checked and perpendicular to the plane of said template.

6. A checking device for checking the contour surface of a work piece, especially the inner trochoidal contour of a housing for a rotary piston engine, which includes: a template having an outside contour shaped in conformity with the contour surface of the work piece to be checked, means for locating said template and a work piece to be checked coaxially with regard to each other so that the template will be located within and in spaced relationship to the contour of the work piece to be checked, at least one arm pivotable about the common axis of said template and the work piece to be checked and extending radially from said common axis, two rotatable feeler disc means supported by and displaceable on said arm radially of said common axis, each of said feeler disc means having its outer peripheral surface arranged for contacting engagement with the contour surface of said template and the corresponding contour surface of the work piece to be checked respectively, yieldable means arranged between said feeler disc means and biasing the same so as to urge said feeler disc means to move relative to each other in the direction toward said template and the work piece to be checked respectively, and indicating means responsive to a movement of said feeler disc means relative to each other for indicating such relative movement.

7. An arrangement according to claim 2, in which the said circular contacting surfaces of the feeler members on one and the same arm have respectively different radii.

References Cited by the Examiner

UNITED STATES PATENTS

| 2,236,226 | 3/1941 | Urschel | 33—174 |
| 2,627,664 | 2/1953 | Moss | 33—180 |
| 2,859,529 | 11/1958 | Aller | 33—174 |

ISAAC LISANN, *Primary Examiner.*

LEONARD FORMAN, *Examiner.*